United States Patent [19]
Parkinson et al.

[11] Patent Number: 5,853,266
[45] Date of Patent: Dec. 29, 1998

[54] FLUIDISING APPARATUS

[75] Inventors: David John Parkinson; James Edward Delves, both of Bristol, United Kingdom

[73] Assignee: Merpro Tortek Limited, Angus, United Kingdom

[21] Appl. No.: 750,913

[22] PCT Filed: Jul. 12, 1995

[86] PCT No.: PCT/GB95/01636

§ 371 Date: Jan. 17, 1997

§ 102(e) Date: Jan. 17, 1997

[87] PCT Pub. No.: WO96/05128

PCT Pub. Date: Feb. 22, 1996

[30] Foreign Application Priority Data

Aug. 11, 1994 [GB] United Kingdom ............... 9416244

[51] Int. Cl.[6] ................................................ B65G 53/42
[52] U.S. Cl. ........................................... 406/143; 406/142
[58] Field of Search ................................. 406/136, 142, 406/143

[56] References Cited

U.S. PATENT DOCUMENTS

| 528,418 | 10/1894 | Duckham | 406/142 |
| 2,659,633 | 11/1953 | McClure | 406/142 |
| 2,800,432 | 7/1957 | Weinrich | 406/142 |
| 2,878,076 | 3/1959 | Milliken | 406/142 |
| 3,093,420 | 6/1963 | Levene et al. | 406/142 |

FOREIGN PATENT DOCUMENTS

| 288525 | 11/1989 | Japan | 406/142 |
| 631410 | 11/1978 | U.S.S.R. | 406/142 |
| 1206212 | 1/1986 | U.S.S.R. | 406/142 |

*Primary Examiner*—Gary C. Hoge
*Attorney, Agent, or Firm*—Andrus, Sceales, Starke & Sawall

[57] ABSTRACT

A fluidising unit (1) comprising a supply duct (2) which is arranged to be fed with liquid under pressure, and a discharge duct (5) within the supply duct and projecting beyond the outlet of the supply duct. The end of the supply duct (2) is closable when the fluidising unit is not in use. A screen (9) is associated with the supply duct (2), the screen having at least one oblique opening (10), and being positioned so that liquid passing through the supply duct passes through the or each opening in the screen and is caused to swirl.

8 Claims, 3 Drawing Sheets

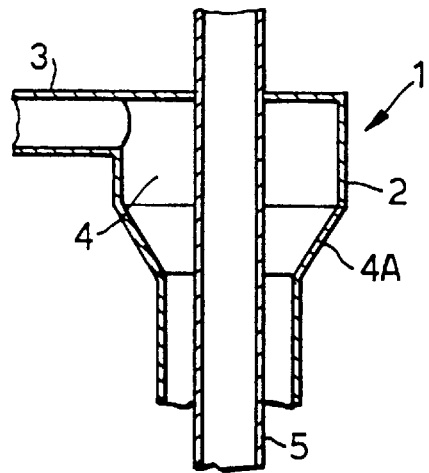
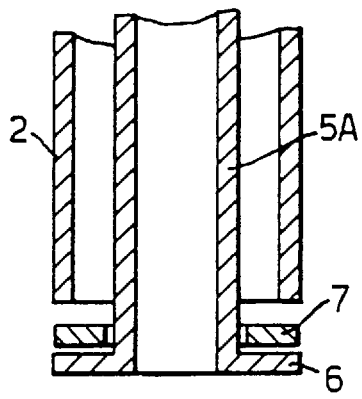
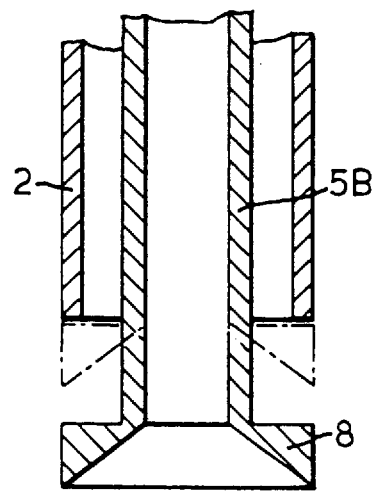

FLUIDISING APPARATUS

CROSS-REFERENCE TO RELATED APPLICATIONS

In our earlier U.S. Pat. Nos. 4,978,251, 4,952,099 and 4,992,006, there are disclosed fluidising units of the kind comprising a supply duct which is arranged to be fed with liquid under pressure, and a discharge duct within the supply duct and projecting beyond the outlet of the supply duct, (hereinafter referred to as of the kind described).

BACKGROUND OF THE INVENTION—BRIEF SUMMARY OF THE INVENTION

This application relates to certain improvement in the fluidising unit of the kind described.

In some applications, it is useful to operate the fluidising unit in orientations in which the supply duct opens upwardly. In such a position, it is possible that particles of the medium in which the fluidising unit is operating will get into the supply duct and block it up.

According to a first aspect of the present invention, a fluidising unit of the kind described is characterised in that the end of the supply duct of the fluidising unit is closable when the fluidising unit is not in use.

The supply duct may be closable by a valve member, such as an annular valve member which is slidable on the discharge duct between an open position in which liquid can leave the supply duct, and a closed position in which the valve member seals against the supply duct. The valve member may be arranged to be opened by the pressure of the liquid in the supply duct.

Alternatively, the discharge duct may be provided with a radially projecting flange, and the discharge duct may be axially movable within the supply duct so that the radially projecting flange can be brought into contact with the end of the supply duct to seal the supply duct.

In a second improvement forming a second, independent aspect of the present invention, a fluidising unit of the kind described has a screen which is provided at the outlet of the supply duct of the fluidising unit, the screen having at least one oblique opening positioned so that liquid passing through the supply duct passes through the opening(s) in the screen and is caused to swirl; characterised in that the discharge duct is provided with a radially outwardly projecting annular flange, and the screen is provided between the end of the supply duct and the annular flange.

The swirl of the liquid can be improved if a cowl is provided to surround the screen with an annular gap between the screen and the cowl.

BRIEF DESCRIPTION OF THE SEVERAL VIEWS OF THE DRAWING

Examples of fluidising unit constructed in accordance with the various aspects of the present invention will now be described with reference to the accompanying drawings, in which:

FIG. 1 is a cross section of a known fluidising unit;

FIG. 2 is a cross section of an end of the fluidising unit in accordance with the first aspect of the present invention;

FIG. 3 is a cross section of an end of a second example of a fluidising unit in accordance with the first aspect of the present invention;

DETAILED DESCRIPTION OF THE INVENTION

Figure 4:
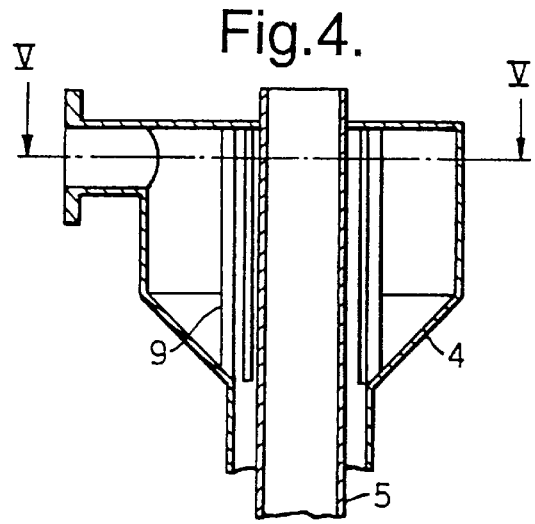
FIG. 4 is a cross section of a fluidising unit included for background interest only.

The fluidising unit 1 shown in FIG. 1 is of the general kind described in U.S. Pat. Nos. 4,978,251, 4,952,099 and 4,992,006. The fluidising unit 1 comprises a liquid supply duct 2 which consists of a feed line 3 and an annular chamber 4 which has a stepped portion 4A so that the chamber is stepped down to a smaller diameter towards the outlet of the discharge duct. The feed line 3 leads tangentially into the annular chamber 4 to cause the fluid supplied to the annular chamber to swirl. A discharge duct 5 is provided within and projects beyond the end of the annular chamber 4.

In use, the fluidising unit 1 is placed in a medium to be fluidised. Liquid is supplied through the liquid supply duct to fluidise the medium. The liquid and the medium are then discharged through a discharge duct 5.

Examples constructed in accordance with a first aspect of the present invention are shown in FIGS. 2 and 3.

In FIG. 2, most of the fluidising unit is as shown in FIG. 1, but the end of the discharge duct 5A has been modified. At the end of the discharge duct 5A there is a radially outwardly projecting annular flange 6. An annular valve element 7 surrounds the discharge duct 5A and is retained on the discharge duct by the annular flange 6. The valve element 7 is arranged to be biased into a closed position in which it abuts the end supply duct 2 and seals the annulus between supply duct 2 and discharge duct 5A. When the fluidising unit is to be used, liquid is fed through the liquid supply duct 2, and the biasing of the valve element 7 is such that it is overcome by the force of the liquid in the liquid supply duct and the valve element is therefore forced into an open position to allow the passage of the fluid out of the liquid supply duct.

A second example constructed in accordance with the first aspect of the present invention is shown in FIG. 3. In this case, most of the fluidising unit is as shown in FIG. 1, but the end of the discharge duct 5B is modified to have a radially outwardly projecting annular flange 8. In addition, the discharge duct 5B is axially movable within the liquid supply duct 2 from an open position (as shown in solid lines in FIG. 3) to a closed position in which the flange 8 abuts against the end of the liquid supply duct 2 (as shown in dotted lines in FIG. 3). As with the first example, this can also be arranged so that the discharge duct is moved axially by the force of liquid in the supply duct 2.

Figure 5:
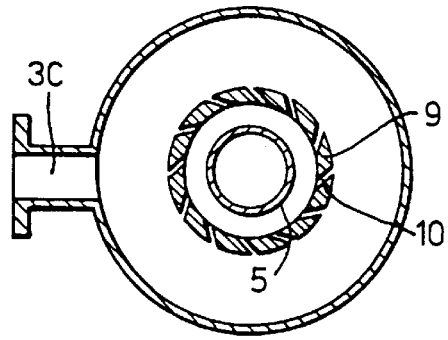
FIG. 5 is a section through line V—V of FIG. 4.

A further example of a fluidising unit is shown in FIGS. 4 and 5. This example differs from that shown in FIG. 1 firstly in that the inlet 3C is radial and secondly in that a screen 9 is provided in the chamber 4 separating the inlet 3C from the outlet of the discharge duct 2.

As best shown in FIG. 5 the screen 9 is provided with slots 10 which are inclined in the radial direction.

The liquid entering the chamber 4 passes through the slots 10 and is caused to swirl around the discharge duct 5.

Figure 6:
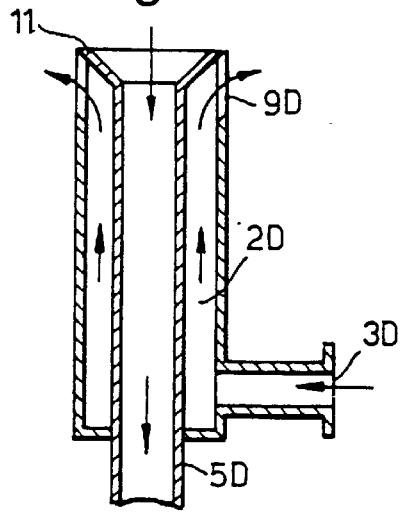
FIG. 6 is a cross section of a first example of a fluidising unit in accordance with a second aspect of the present invention.

An example constructed in accordance with a second aspect of the present invention is shown in FIG. 6. In this example, the supply duct 2D and the discharge duct 2D open upwardly. The discharge duct 2D, is provided at its end with a radially outwardly extending flange 11. A screen 9D which is similar in construction to that shown in FIG. 5 is fitted between the end of the supply duct 2D and the end of the flange 11. Thus water in the supply duct is not caused to swirl until it leaves the supply duct.

Figure 7:
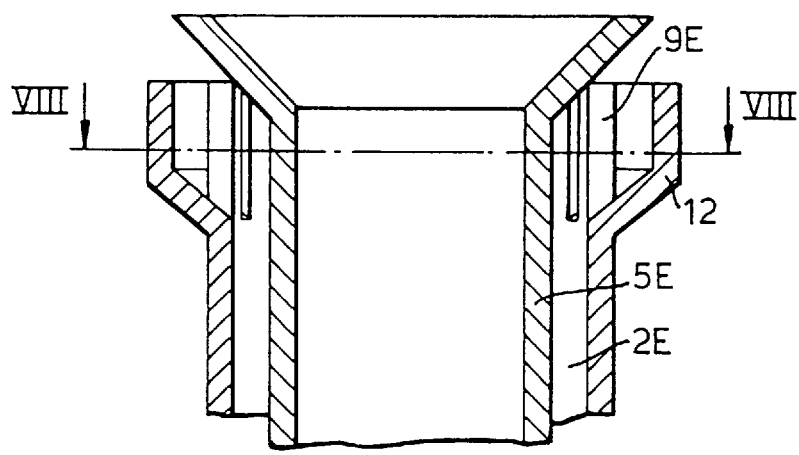
FIG. 7 is a cross section of a second example of a fluidising unit in accordance with a second aspect of the present invention.
Figure 8:
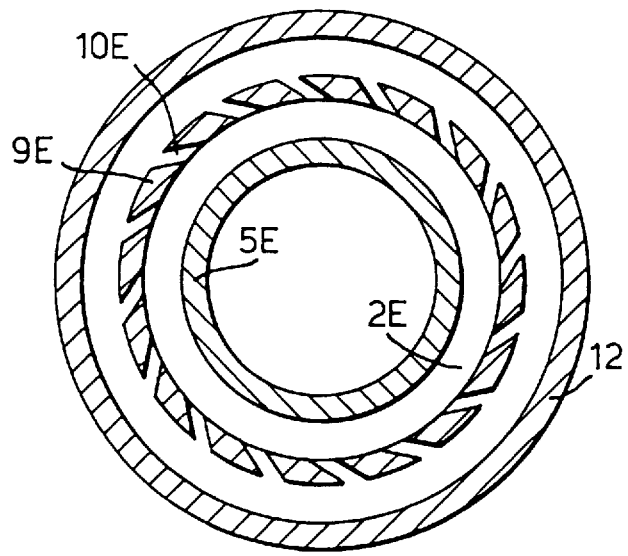
FIG. 8 is a section through line VIII—VIII of FIG. 7.

A second example constructed in accordance with a second aspect of the present invention is shown in FIGS. 7 and 8. This is the same as the first example of FIG. 6, except that a cowl 12 is integrally provided on the end of the supply duct 2E and surrounds the screen 9E leaving an annular gap between the cowl and the screen. The cowl 12 serves to improve the swirl of the liquid leaving the supply duct 2E.

We claim:

1. A fluidising unit (1) comprising a supply duct (2) which is arranged to be fed with liquid under pressure, and a discharge duct (5A, 5B) within the supply duct, the end of the supply duct (2) of the fluidising unit (1) being closable when the fluidising unit is not in use.

2. A fluidising unit according to claim 1, wherein the supply duct (2) is closable by a valve member (7).

3. A fluidising unit according to claim 2, wherein the valve member (7) is arranged to be opened by the pressure of the liquid in the supply duct.

4. A fluidising unit according to claim 1, wherein the valve member is an annular valve member (7) which is slidable on the discharge duct (5A) between an open position in which liquid can leave the supply duct, and a closed position in which the valve member seals against the supply duct (2).

5. A fluidising unit according to claim 4, wherein the valve member (7) is arranged to be opened by the pressure of the liquid in the supply duct.

6. A fluidising unit according to claim 1, wherein the discharge duct (5B) is provided with a radially projecting flange (8), and is axially movable within the supply duct (2) so that the radially projecting flange can be brought into contact with the end of the supply duct to seal the supply duct.

7. A fluidising unit comprising a supply duct (2) which is arranged to be fed with liquid under pressure, and a discharge duct (5) within the supply duct and projecting beyond the outlet of the supply duct, wherein a screen (9D, 9E) is provided at the outlet of the supply duct (2) of the fluidising unit (1), the screen having at least one oblique opening (10) positioned so that liquid passing through the supply duct passes through the opening(s) in the screen and is caused to swirl about the axis of the supply duct; the discharge duct (5D) being provided with a radially outwardly projecting annular flange (11), and the screen is provided between the end of the supply duct (2D) and the annular flange.

8. A fluidising unit according to claim 7, wherein a cowl (12) is provided to surround the screen with an annular gap between the screen and the cowl.

* * * * *